(12) United States Patent
Yagnik

(10) Patent No.: US 8,165,414 B1
(45) Date of Patent: Apr. 24, 2012

(54) VECTOR TRANSFORMATION FOR INDEXING, SIMILARITY SEARCH AND CLASSIFICATION

(75) Inventor: Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/288,706

(22) Filed: Nov. 3, 2011

Related U.S. Application Data

(60) Provisional application No. 61/412,711, filed on Nov. 11, 2010.

(51) Int. Cl.
*G06K 9/40* (2006.01)
*G06E 1/00* (2006.01)
(52) U.S. Cl. ........................ 382/255; 382/236; 706/20
(58) Field of Classification Search .............. 382/100, 382/103, 106, 107, 155, 168, 173, 181, 191–197, 382/209, 232, 236, 254, 274, 286–298, 305, 382/312, 255; 706/20; 380/201; 707/653, 707/737; 700/94; 709/223
See application file for complete search history.

(56) References Cited

U.S. PATENT DOCUMENTS

| | | | | |
|---|---|---|---|---|
| 6,892,193 | B2 * | 5/2005 | Bolle et al. | 706/20 |
| 7,574,276 | B2 * | 8/2009 | Weare et al. | 700/94 |
| 7,756,874 | B2 * | 7/2010 | Hoekman et al. | 707/737 |
| 7,813,822 | B1 * | 10/2010 | Hoffberg | 700/94 |
| 7,941,516 | B2 * | 5/2011 | Wong et al. | 709/223 |
| 7,974,714 | B2 * | 7/2011 | Hoffberg | 700/94 |
| 8,059,815 | B2 * | 11/2011 | Lofgren et al. | 380/201 |
| 8,060,477 | B1 * | 11/2011 | Svendsen | 707/653 |

OTHER PUBLICATIONS

Bhat, D., et al., "Ordinal Measures for Visual Correspondence," IEEE Computer Society Conference on Computer Vision and Pattern Recognition (CVPR'96), 1996, pp. 351-357.
Broder, A.Z., et al., "Min-wise independent permutations," Annual ACM Symposium on Theory of Computing, 1998, pp. 327-336.
Broder, A.Z., "On the resemblance and containment of documents," IEEE Computer Society Compression and Complexity of Sequences 1997, pp. 21-29.
Da Costa, J., et al., "A Weighted Rank Measure of Correlation," Australian & New Zealand Journal of Statistics, Dec. 2005, pp. 515-529, vol. 47, Issue 4.
Diaconis, P., et al., "Spearman's footrule as a measure of disarray," Journal of the Royal Statistical Society. Series B (Methodological) 1977, pp. 262-268.

(Continued)

*Primary Examiner* — Seyed Azarian
(74) *Attorney, Agent, or Firm* — Fenwick & West LLP

(57) ABSTRACT

A feature vector is encoded into a sparse binary vector. The feature vector is retrieved, for example from storage or a feature vector generator. The feature vector represents a media object or other data object. One or more permutations are generated, the dimensionality of the generated permutations equivalent to the dimensionality of the feature vector. The permutations may be generated randomly or formulaically. The feature vector is permuted with the one or more permutations, creating one or more permuted feature vectors. The permuted feature vectors are truncated according to a selected window size. The indexes representing the maximum values of the permuted feature vectors are identified and encoded using one-hot encoding, producing one or more sparse binary vectors. The sparse binary vectors may be concatenated into a single sparse binary vector and stored. The sparse binary vector may be used in the similarity search, indexing or categorization of media objects.

30 Claims, 6 Drawing Sheets

OTHER PUBLICATIONS

Eshghi, K., et al., "Locality sensitive hash functions based on concomitant rank order statistics," In Proceedings of ACM SIGKDD conference on Knowledge Discovery and Data Mining, Aug. 2008, pp. 221-229.

Friedman, J., et al., "An Overview of Predictive Learning and Function Approximation," in From Statistics to Neural Networks, 1994, pp. pp. 1-61.

Indyk, P., et al., "Approximate nearest neighbors: towards removing the curse of dimensionality," Annual ACM Symposium on Theory of Computing, 1998, pp. 604-613.

Lepetit, V., et al., "Keypoint recognition using randomized trees," IEEE Transactions on Pattern Analysis and Machine Intelligence, Sep. 2006, pp. 1465-1479, vol. 28, No. 9.

Lifshit, Y., et al., "Combinatorial Algorithms for Nearest Neighbors, Near-Duplicates and Small World Design," SODA, 2009, pp. 318-326, SIAM.

Maturi, T., et al., "A New Weighted Rank Correlation," Journal of Mathematics and Statistics, 2008, pp. 226-230, vol. 4, No. 4.

Ozuysal, M., et al., Fast Keypoint Recognition in Ten Lines of Code. Computer Vision and Pattern Recognition, 2007, 8 pages.

Ozuysal, M., et al., "Feature harvesting for tracking-by-detection," Proceedings European Conference on Computer Vision, 2006, vol. 3, pp. 592-605.

Pele, O., et al., "Robust real time pattern matching using bayesian sequential hypothesis testing," IEEE Transaction Pattern Analysis and Machine Intelligence, Aug. 2008, pp. 1427-1443, vol. 30, No. 8.

Shieh, G., "A weighted Kendall's tau statistic," Statistics & Probability Letters, Jul. 1998, pp. 17-24, vol. 39, Issue 1, 15.

Shumeet, B., et al., Boosting Sex Identification Performance, International Journal of Computer Vision, Jan. 2007, vol. 71, No. 1, pp. 111-119.

Tschopp, D., et al., "Approximate nearest neighbor search through comparisons," ArXiv preprint 0909.2194, 2009, pp. 1-19.

Zabih, R., et al., "Non-parametric local transforms for computing visual correspondence," Proceedings European Conference on Computer Vision, 1994, vol. 2, pp. 151-158.

\* cited by examiner

VECTOR TRANSFORMATION FOR INDEXING, SIMILARITY SEARCH AND CLASSIFICATION

CROSS REFERENCE TO RELATED APPLICATIONS

The application claims the benefit of Provisional Application No. 61/412,711, filed on Nov. 11, 2010, which is incorporated herein by reference.

FIELD OF ART

The present disclosure generally relates to the fields of data indexing, similarity search and classifications, and more specifically to the manipulation of high-dimensional vector space data.

BACKGROUND

Vectors are commonly used to represent the feature space of various phenomena. For example, vectors are used to represent the features of images, videos, audio clips, and other media. It should be noted that the utility of vector space operations is not limited to digital media, but may additionally be applied to other data, to physical objects, or to any other entity capable of feature representation. In the media space, features include color distributions (using, for example, 4×4 pixel hue and saturation histograms), the mean and variance of color intensities across color channels, color intensity difference inside and outside of pixel rectangles, edges, mean edge energy, texture, video motion, audio volume, audio spectrogram features, the presence of words or faces in images, or any other suitable media property.

Vector space representations are particularly useful in the classification, indexing, and determination of similarity in digital media; determining the distance between digital media feature vectors is fundamental to these operations. The manual classification and indexing of digital media requires a human operator, and results in, for large media collections, prohibitively expensive and expansive operations. Further, similarity search within a large media library requires analysis of all entries in the library, and even automated library analysis requires processing resource-intensive capabilities. Unfortunately, high-dimensional feature vectors of digital media are also prone to noise, reducing the effectiveness of vector distance determinations on such vectors, and reducing the ability to detect vector distance differences resulting from changes to a small number of vector features.

Many data classification tasks rely on vector space representations to represent the particular data of interest. One common data classification operation involves determining the similarity between two data objects. Using a vector space representation of the data objects allows a determination of similarity to be made based on the distance, such as the Euclidean distance, between the two vectors, such as coordinate vectors, representing the data objects. A change in the value of single vector component has an effect on the distance between the vectors that is inversely proportional to the number of dimensions of the vectors. Thus, the larger the number of dimension in a vector, the smaller the effect changes in a single vector component has on the distance between the vectors.

In use, the elements of vectors in vector space operations are susceptible to noise, whether naturally occurring or otherwise. As the number of dimensions in a vector space increases, the determination of the distance between two vectors is increasingly affected by the compounding of noise affecting individual elements of the vectors. The magnitude of the compounded noise in distance determinations may exceed the magnitude of the change in distance determinations as a result of changes to a single vector dimension at high dimensional vector spaces. This is problematic in instances where it is desirable to measure the change in distance between vectors caused by the change of a small number of elements in the vectors.

SUMMARY

A feature vector representing a media object or other data object is encoded. The feature vector may be retrieved from a storage module, or may be generated by a feature vector generator. The media object or other data object may be, for example, an image, a video, an audio clip, a database, a spreadsheet, or a document. One or more permutations are generated, each permutation including a vector of ordinals of the same dimensionality as the feature vector. The one or more permutations can be generated randomly, resulting in a random ordering of each permutation's ordinals. The feature vector is permuted with the one or more permutations by re-ordering the entries of the feature vector according to the ordinals of the permutations, creating one or more permuted feature vectors.

A window size is selected, for instance randomly. The window size can vary from 2 to the dimensionality of the feature vector. The window size can be selected such that the encoded feature vectors are biased towards the beginning of the permuted feature vectors. The permuted feature vectors are truncated according to the selected window size, such that a number of beginning vector values equivalent to the selected window size are maintained and the remaining vector values are discarded. The index of the maximum value of each truncated permuted feature vector is identified and encoded using, for instance, one-hot encoding. The encoded indexes may be concatenated into a single sparse binary vector, which may be stored for subsequent retrieval.

One or more sparse binary vectors (each associated with one or more particular features of a media object) can be produced for each media object in a media library. The sparse binary vectors can be stored in conjunction with the media objects in the media library. A similarity search between a target media object and the media library can be performed on the stored sparse binary vectors and a sparse binary vector associated with a target media object by computing the dot product between the sparse binary vector associated with the target media object and the one or more sparse binary vector associated with each stored media object. The media object associated with the largest dot product may be selected as the stored media object most similar to the target media object with regards to the feature or features associated with the sparse binary vectors.

In one embodiment, a feature vector can be encoded over a polynomial space. A set of permutations is generated, the number of permutations in the set equal to the degree of the polynomial space. The feature vector is then permuted with the set of permutations, and the resulting permuted feature vectors are truncated according to a selected window size. A product vector the same dimensionality as the truncated permuted vectors is created, and the value at each index of the product vector is the product of the values at the particular index of each truncated permuted vector. The index of the maximum value of the product vector is then identified and encoded using, for example, one-hot encoding to produce a sparse binary vector representing the feature vector over the polynomial space.

A data processing system can encode feature vectors representing stored media objects into sparse binary vectors, and can stored the sparse binary vectors in conjunction with the stored media objects. The data processing system can use the stored sparse binary vectors to perform similarity searches on media objects. The sparse binary vectors may also be used to categorize or tag the media objects, to index the media objects, and to otherwise process feature information related to the media objects.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

Figure 1:
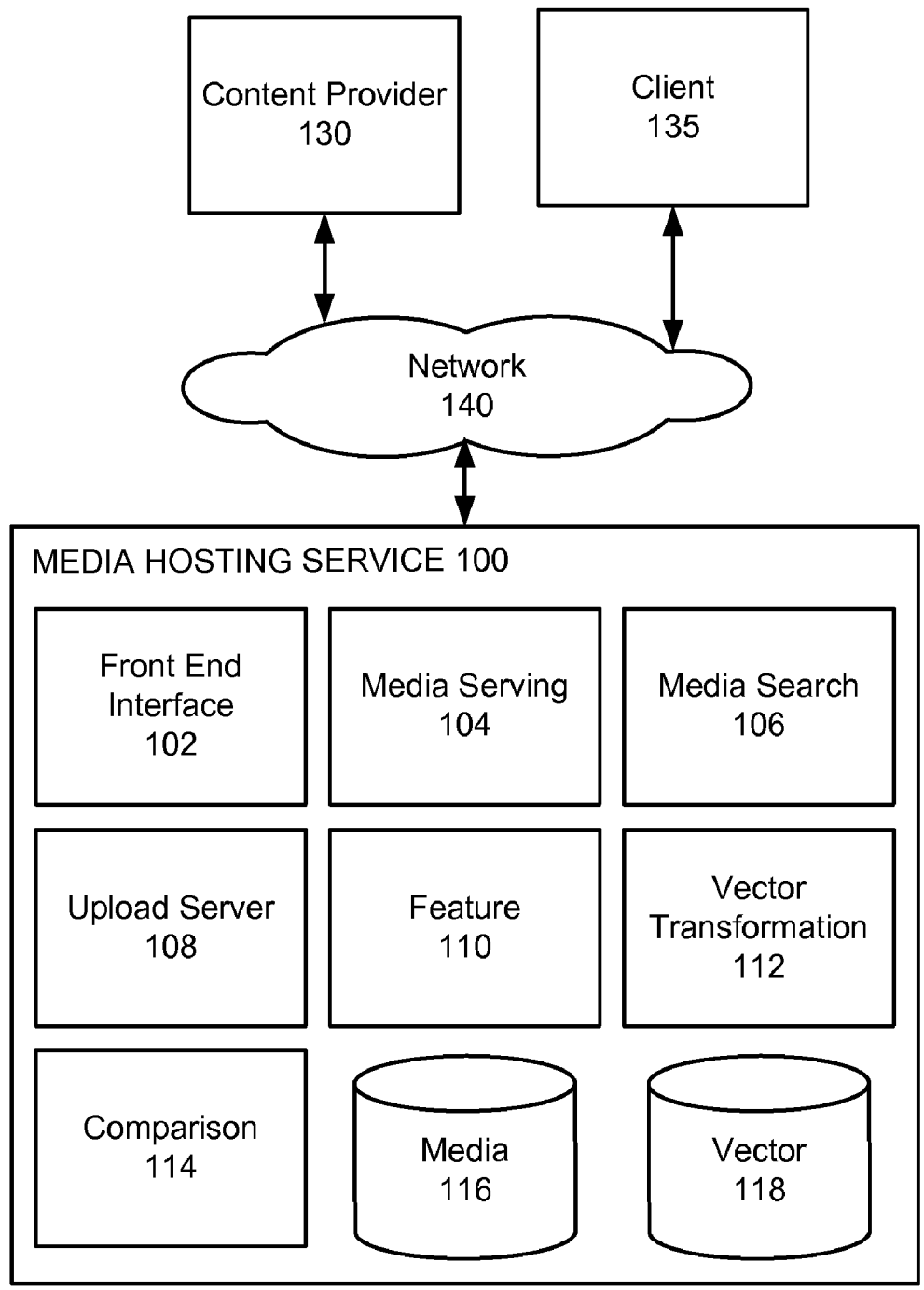
FIG. 1 is a block diagram of a media hosting service according to one embodiment.

FIG. 1 is a block diagram of a media hosting service in which data processing operations on vector data representing media objects are performed, according to one embodiment. The media hosting service 100 represents a system such as that of YOUTUBE™ that stores and provides videos and other media (such as images, audio, and the like) to clients such as the client 135. The media hosting service 100 communicates with a plurality of content providers 130 and clients 135 via a network 140 to facilitate sharing of media content between entities. The media hosting service 100 may be implemented in a cloud computing network, accessible by the content providers 130 and the clients 135 over the network 140. Note that for the sake of clarity FIG. 1 depicts only one instance of content provider 130 and client 135, though in practice there will large numbers of each. It should be noted that the vector transformation discussed herein is equally applicable to non-media data objects (such as documents, spreadsheets, data collections, and the like), though the description herein is primarily directed to media objects solely for the purpose of simplicity.

The media hosting service 100 additionally includes a front end interface 102, a media serving module 104, a media search module 106, an upload server 108, a feature module 110, a vector transformation module 112, a comparison module 114, a media storage module 116, and a vector storage module 118. Other conventional features, such as firewalls, load balancers, authentication servers, application servers, failover servers, site management tools, and so forth, are not shown so as to more clearly illustrate the features of the media hosting service 100. While an example of a suitable service 100 is the YOUTUBE website, found at www.youtube.com, other media hosting sites can be adapted to operate according to the teachings disclosed herein. The illustrated components of the media hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the media hosting service 100 can also be performed by one or more clients 135 in other embodiments if appropriate.

Clients 135 are computing devices that execute client software, e.g., a web browser or built-in client application, to connect to the front end interface 102 of the media hosting service 100 via a network 140 and to display or otherwise interact with media. The client 135 might be, for example, a personal computer, a personal digital assistant, a cellular, mobile, or smart phone, a tablet, or a laptop computer. The network 140 is typically the Internet, but may be any network, including but not limited to a LAN, a MAN, a WAN, a mobile wired or wireless network, a private network, or a virtual private network. In some embodiments, the network is a cloud computing network.

Generally, the content provider 130 provides media content to the media hosting service 100 and the client 135 interacts with that content. In practice, content providers may also be clients 135. Additionally, the content provider 130 may be the same entity that operates the media hosting service 100. The content provider 130 operates a client to perform various content provider functions. Content provider functions may include, for example, uploading a media file to the media hosting service 100, editing a media file stored by the media hosting service 100, indexing media stored by the media hosting service 100, requesting the categorization and/or tagging of media stored by the media hosting servicer 100, and performing similarity searches on media stored by the media hosting service 100.

The client 135 may also be used to configure viewer preferences related to media content. In some embodiments, the client 135 includes an embedded media player such as, for example, the FLASH player from Adobe Systems, Inc. or any other player adapted for the media file formats used in the media hosting service 100. The client 135 may be adapted to request that the media hosting service perform similarity searches on stored media, index or tag stored media, fingerprint media, classify media, or any other data-processing functions.

The upload server 108 of the media hosting service 100 receives media content from a content provider 130. Received content is stored in the media storage module 116. In response to requests from a client 135, a media serving module 104 provides media data from the media storage module 116 to the client 135. Clients 135 may also search for media of interest stored in the media storage module 116 using a media search module 106, such as by entering textual queries containing keywords of interest. The front end interface 102 provides the interface between the clients 135 and the various components of the media hosting service 100.

The feature module 110 is configured to derive a set of features for a media object or other data object i, collectively referred to as a feature vector $F_i$. Embodiments below will be described with respect to media objects; however, the discussion also applies more generally to other data objects.

The set of all feature vectors $F_i$ for all media objects is denoted as F. Each feature vector $F_i$ is derived from one or more properties or characteristics ("features") of a media object. The features can be derived from the video, audio, textual, image, metadata, or other content of the media object. For example, a feature vector $F_i$ may include features describing the motion, color, texture, gradients, edges, interest points, corners, or other visual characteristics of a video or images. Other features include SIFT, SURF, GLOH, LESH and HoG, as well as space scale and affine representations. Features can also include audio features, such as spectrogram features, and Mel-frequency cepstral coefficients, and the like. Textual features can include bag of words representations, along with TF/IDF values and the like, as derived from the media content as well as from metadata (e.g., a description or summary of the media, tags, keywords, etc.). Features can also include data representing user interactions with the media data, such as view counts, downloads, co-watches, likes, and so forth. Features can also include category and tag information. The feature module 110 may produce feature vectors $F_i$ based on features described in co-pending U.S. application Ser. No. 12/881,078, filed Sep. 13, 2010, and co-pending U.S. application Ser. No. 12/950,955, filed Nov. 19, 2010, the contents of each of which are hereby incorporated by reference. The feature module 110 stores generated feature vectors F in the vector storage module 118. The media storage module 116 and the vector storage module 118 can be any non-transitory computer readable data storage apparatus, using any type of data retrieval mechanism, e.g., database, file system, etc.

The entries (components) of the feature vectors F are numeric and typically real valued, and each feature vector entry is associated with an ordinal or index. For example, for the feature vector [3, 17, 9, 1], the "3" is referred to as the first entry and is said to be at index "0", the "17" is referred to as the second entry and is said to be at index "1", and so forth. Each feature vector entry represents a measurement or value associated with the particular feature or features of a media object represented by the feature vector $F_i$ for the media object. For example, if the above feature vector represented the brightness of various pixels in an image, each of the entries "3", "17", "9", and "1" might represent the luminance levels of corresponding pixels. The dimensionality (or cardinality) is the number of components in the feature vector; in this example the dimensionality is 4. In practice, the feature vectors F have high dimensionality, with upwards of 500 dimensions, depending on the type of media objects associated with the feature vectors F. Complex media objects, such as video may be represented by vectors with ten or even twenty thousand dimensions. The high dimensionality of these vectors makes the efficient processing of the feature vectors provided by the methods disclosed herein particularly beneficial.

The feature module 110 may produce a feature vector $F_i$ for a media object stored in the media object storage module 116, for a media object uploaded by a content provider 130 or requested by a client 135, or for any other media objects. The feature module 110 may produce one or more feature vectors for media objects as they are received from content providers 130, or may produce one or more feature vectors for media objects when queried, for instance by the vector transformation module 112. Feature vectors F generated for media objects and stored in the vector storage module 118 may be stored in conjunction with the media objects stored in the media storage module 116 for subsequent retrieval.

Figure 2:
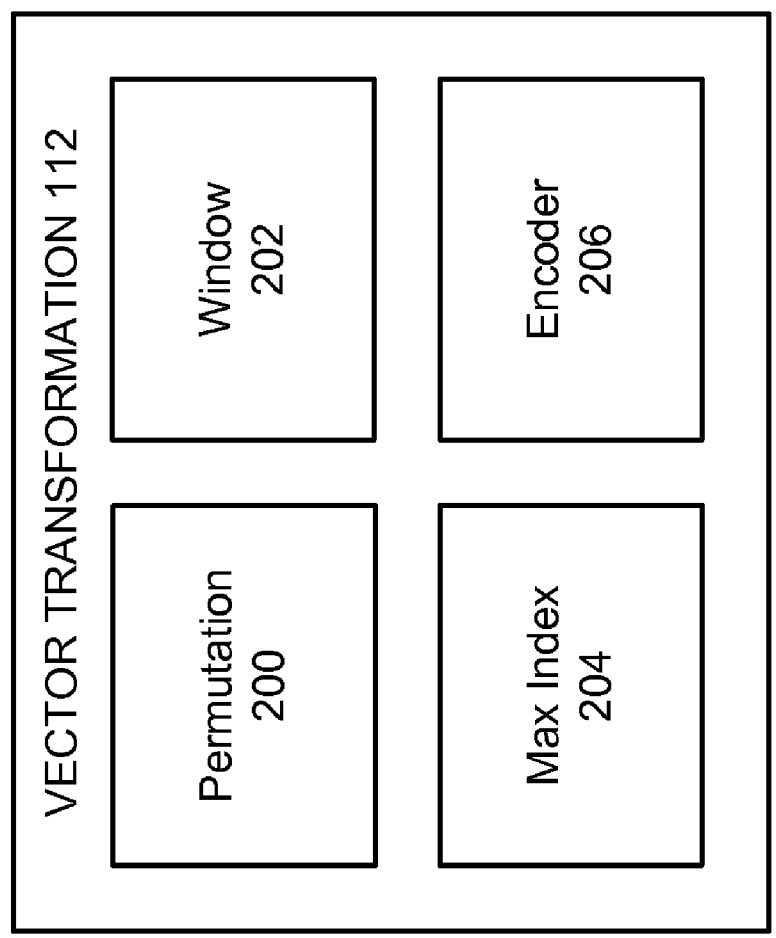
FIG. 2 illustrates the various components of the vector transformation module of FIG. 1, according to one embodiment.

The vector transformation module 112 retrieves a media object feature vector F from the vector storage module 118 and transforms the retrieved vector F into a sparse binary feature vector S. FIG. 2 illustrates the various components of the vector transformation module 112, according to one embodiment. The vector transformation module 112 includes a permutation module 200, a window module 202, a max index module 204, and an encoder 206. In other embodiments, the modules of the vector transformation 112 perform different functions than those described herein.

After retrieving a feature vector from the vector storage module 118, the permutation module 200 permutes the retrieved feature vector $F_i$ with one or more permutations $\theta_j$. The permutation module 200 may generate the one or more permutations $\theta_j$, or may retrieve the permutations $\theta_j$ from, for example, the vector storage module 118. A permutation $\theta_j$, is a sequence of ordinals that describe a reordering of the components a feature vector $F_i$ by the permutation module 200 producing a set of permuted feature vectors $P_{i,j}$. The $i^{th}$ entry of a permutation $\theta_j$ is an ordinal z representing the index of a value in the feature vector $F_i$ that is to moved to the $i^{th}$ index in the permuted feature vector $P_{i,j}$. Thus, permuting a feature vector $F_i$ with a permutation $\theta_j$ involves reordering the entries of $F_i$ such that $P_{i,j}(x)=F_i(\theta_j(x))$.

Figure 3:
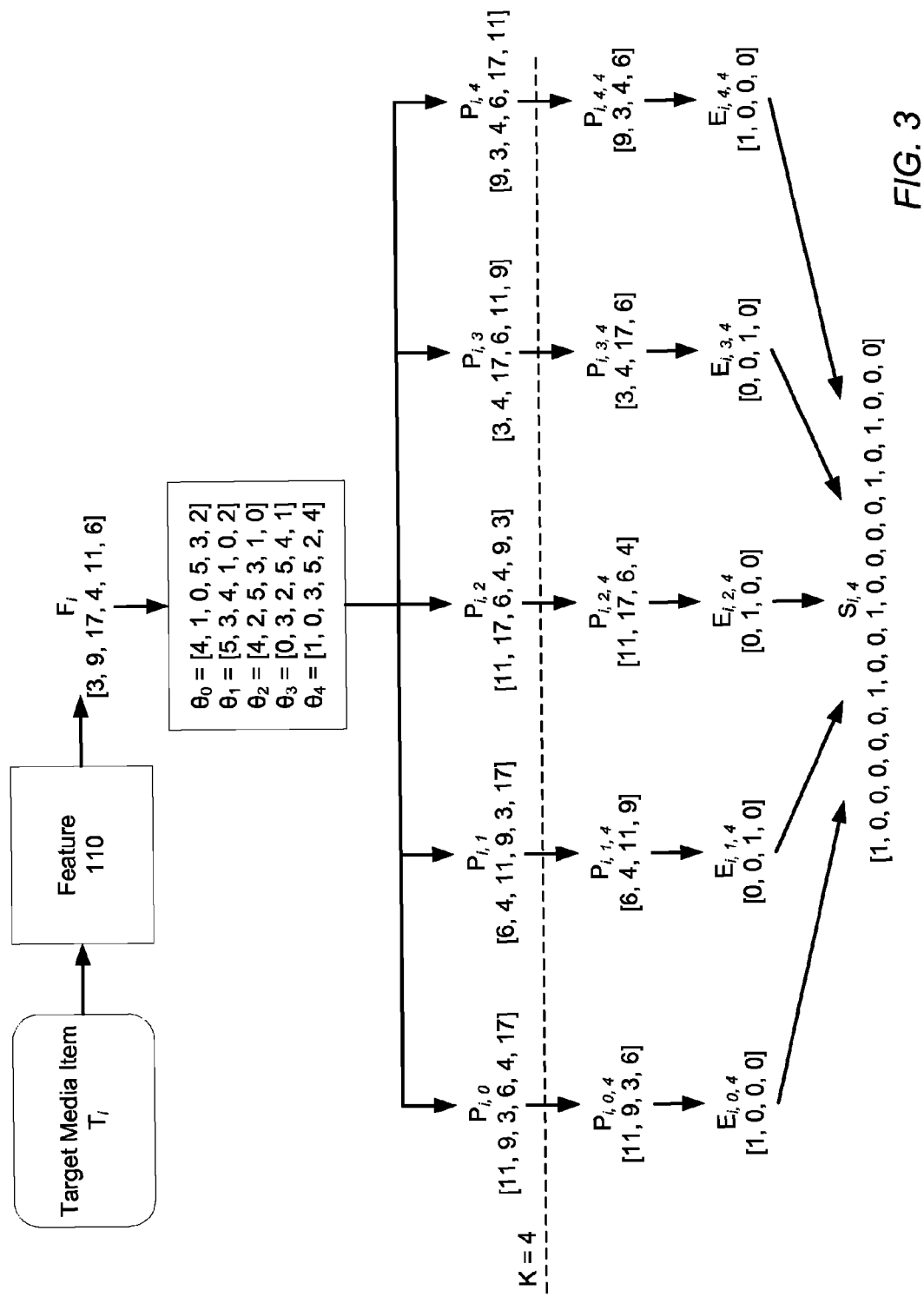
FIG. 3 illustrates a simple example embodiment of the transformation of a feature vector by the vector transformation module of FIG. 1, according to one embodiment.

FIG. 3 illustrates a simple example embodiment of the transformation of a feature vector by the vector transformation module 200, according to one embodiment. In the example of FIG. 3, a feature vector $F_i$ is retrieved from the feature module 110 for a target media object $T_i$. The feature vector $F_i$ is the vector [3, 9, 17, 4, 11, 6], which represents some feature of the target media object $T_i$.

In the example of FIG. 3, a set of five permutations $\theta_0$ to $\theta_4$ is randomly generated as follows:

$\theta_0=[4,1,0,5,3,2]$ $\theta_1=[5,3,4,1,0,2]$ $\theta_2=[4,2,5,3,1,0]$ $\theta_3=[0,3,2,5,4,1]$ $\theta_4=[1,0,3,5,2,4]$ The dimensionality of each permutation $\theta_j$ is the same as the dimensionality of the feature vector $F_i$. Permuting the feature vector $F_i$ with each permutation $\theta_j$ results in 5 permutations vectors, $P_{i,0}$ to $P_{i,4}$. For example, the permutation vector $P_{i,0}$ includes the 6 entries:

$P_{i,0}(0)=F_i(\theta_0(0))=F_i(4)=11$ $P_{i,0}(1)=F_i(\theta_0(1))=F_i(1)=9$ $P_{i,0}(2)=F_i(\theta_0(2))=F_i(0)=3$ $P_{i,0}(3)=F_i(\theta_0(3))=F_i(5)=6$ $P_{i,0}(4)=F_i(\theta_0(4))=F_i(3)=4$ $P_{i,0}(5)=F_i(\theta_0(5))=F_i(2)=17$ The permutations $\theta_j$ can be generated randomly (e.g., random selection without replacement from the set of integers {0, N} where N is the dimensionality of the feature vectors) or formulaically. The generated permutations can be stored in, for instance, the vector storage module 118 for subsequent use. In addition to generating the one or more permutations $\theta_j$, the permutation module 200 may retrieve previously generated permutations from the vector storage module 118 in order to permute the retrieved feature vector $F_i$. Storing the generated permutations allows the permutations to be used in many contexts which require the application to a feature vector $F_2$ representing media object $T_2$ of the same permutations applied to a feature vector $F_1$ representing media object $T_1$. For example, the same set of permutations $\theta_j$ is used to permute feature vectors $F_i$ and $F_z$ representing a target media object $T_i$ and a plurality of searchable media objects $M_z$ in order to identify one of the searchable media objects $M_z$ most similar to the target media object $T_i$. In this example, the set of permutations $\theta_j$ is applied to the feature vectors $F_z$ and stored in the vector storage module 118 for subsequent retrieval and application to the feature vector $F_i$.

The window module 202 generates a magnitude K, $2 \leq K \leq N$, where N is the number of dimensions of the feature vector $F_i$. K is called the "window size" of the permuted vectors $P_{i,j}$. The window module 202 truncates the permuted vectors $P_{i,j}$ to a dimensionality of K, producing truncated permuted vectors $P_{i,j,k}$ by keeping the first K entries of $P_{i,j}$ and discarding the remaining entries. The magnitude K may be determined randomly or by other means.

For embodiments in which feature vectors $F_i$ for multiple media objects are compared, the same magnitude K is used to truncate the permuted vectors $P_{i,j}$ of each media object. Alternatively, K may vary by permuted vector $P_{i,j}$, though the remainder of the description herein assumes K is constant for a set of permuted vectors $P_{i,j}$. The window module 202 may store a set magnitudes $K^m$ corresponding to a set of m features vectors in the vector storage module 118 for the subsequent retrieval and truncation of permuted vectors associated with the media objects for these feature vectors. It should be noted that in instances where K is equal to the dimensionality of the feature vector $F_i$, the permuted vectors $P_{i,j}$ are not truncated; in such instances, $P_{i,j}=P_{i,j,k}$.

In the example of FIG. 3, the window module 202 determines the magnitude K to be 4. The window module 202 then truncates the permuted vectors $P_{i,j}$ to a window size of 4, producing the truncated permuted vectors $P_{i,j,k}$:

$P_{i,0,4}=[11, 9, 3, 6]$ $P_{i,1,4}=[6, 4, 11, 9]$ $P_{i,2,4}=[11, 17, 6, 4]$ $P_{i,3,4}=[3, 4, 17, 6]$ $P_{i,4,4}=[9, 3, 4, 6]$

The max index module 204 identifies the index of the truncated permuted vector entry representing the maximum value of a truncated permuted vector $P_{i,j,k}$ for each truncated permuted vector $P_{i,j,k}$. In one embodiment, the max index module 204 identifies the index of the maximum value of a truncated permuted vector $P_{i,j,k}$ by comparing the value of $P_{i,j,k}$ at index 0 to the value of $P_{i,j,k}$ at index 1, and selecting the index representing the greater of the two values. The max index module 204 next compares the value represented by the selected index with the value of $P_{i,j,k}$ at index 2, and selects the index representing the greater of the two values. This process is repeated for each entry of $P_{i,j,k}$, resulting in the selected index representing the maximum value of $P_{i,j,k}$. It should be noted that in instances where the maximum value of a vector $P_{i,j,k}$ appears twice in $P_{i,j,k}$, the max index module 204 identifies the index of the maximum value which appears first in $P_{i,j,k}$.

In the example of FIG. 3, the max index module 204 selects the index representing the maximum value of each truncated permuted vector. For the vector $P_{i,0,4}$, the max index module 204 identifies the maximum value of "11" to be located at index 0. Likewise, for the vectors $P_{i,1,4}$, $P_{i,2,4}$, $P_{i,3,4}$, and $P_{i,4,4}$, the max index module 204 identifies the maximum values of "11", "17", "17" and "9" to be located at index 2, 1, 2, 0, respectively (the left-most entry in a vector described herein appears at index 0).

The encoder 206 retrieves the identified indexes representing the maximum value of each truncated permuted vector $P_{i,j,k}$, and encodes the identified indexes of the truncated permuted vectors $P_{i,j,k}$, producing encoded vectors $E_{i,j,k}$. The encoder 206 encodes the identified indexes using a one-hot binary encoding scheme, producing encoded vectors $E_{i,j,k}$ of the same dimensionality as the truncated permuted vectors $P_{i,j,k}$, with each entry of the vectors $E_{i,j,k}$ set to 0 except for the entries at the identified indexes, which are set to 1. Although the remainder of this description is limited to instances of one-hot encoding, in other embodiments, the encoder 206 encodes the values of the vectors $P_{i,j,k}$ at the identified indexes (and not just the identified indexes), or utilizes an encoding scheme other than the one-hot binary encoding scheme described herein. For example, the encoder 206 may encode the identified indexes using maximum entropy encoding. Beneficially, encoding the identified indexes using maximum entropy encoding requires only $\log_2(y)$ bits to represent the encoded indexes, where y is the dimensionality of the encoded vectors $E_{i,j,k}$ (compared to y bits for one-hot encoding), though it should be noted that maximum entropy encodings are not vector space representations.

If there is more than one truncated permuted vector $P_{i,j,k}$, the encoder 206 concatenates the encoded vectors $E_{i,j,k}$ into a binary vector $S_{i,k}$, which is stored in the vector storage module 118 for subsequent retrieval. By limiting the selection of the window size K to natural numbers greater than or equal to 2, the dimensionality of the truncated permuted vectors $P_{i,j,k}$ is guaranteed to be greater than or equal to 2. The selection of one index within each vector $P_{i,j,k}$ results in the selection of 50% or less of the total entries across the vectors $P_{i,j,k}$. Thus, encoding the selected indexes with a one-hot binary encoding scheme and concatenating the encoded indexes results in less than 50% of the entries of $S_{i,k}$ being set to 1, guaranteeing that $S_{i,k}$ is a sparse binary vector. In addition to the benefits of using sparse vectors S to represent media object features described herein, it should be noted that performing vector operations on sparse binary vectors S typically requires less computing and storage resources than performing the same operations on the original vectors associated with the sparse binary vectors S.

In the example of FIG. 3, the encoder 206 encodes the selected index 0 from $P_{i,0,4}$ as $E_{i,0,4}=[1, 0, 0, 0]$. Likewise, the selected indexes 2, 1, 2, and 0 from $P_{i,1,4}$, $P_{i,2,4}$, $P_{i,3,4}$, and $P_{i,4,4}$ are encoded as $E_{i,1,4}=[0, 0, 1, 0]$, $E_{i,2,4}=[0, 1, 0, 0]$, $E_{i,3,4}=[0, 0, 1, 0]$, and $E_{i,4,4}=[1, 0, 0, 0]$, respectively. The encoder 206 then concatenates these encoded vectors $E_{i,j,4}$ together to form the sparse binary vector $S_{i,4}=[1,0,0,0,0,0,1, 0,0,1,0,0,0,0,1,0,1,0,0,0]$.

The encoding performed by the vector transformation module 112 may be extended to a polynomial expansion of a feature space. For a polynomial space of degree p, a set of permutations $\theta_p$ is generated, and a feature vector $F_i$ is permuted with the set of permutations $\theta_p$, producing a set of permuted vectors $P_{i,p}$. Selecting a magnitude K and truncating the permuted vectors produces the truncated permuted vectors $P_{i,p,k}$. The product of each dimension across all vectors $P_{i,p,k}$ is determined, producing the product vector $P'_{i,k}$ such that $P'_{i,k}(x)=P_{i,1,k}(x)*P_{i,2,k}(x)* \ldots *P_{zi,p-1,k}(x)*P_{i,p,k}(x)$ for all $0 \leq x \leq K-1$. The maximum value entry of $P'_{i,k}$ is then determined and encoded into a sparse binary vector. Similarly to the example embodiment of FIG. 3, this encoding may be performed for multiple sets of permutations $\theta_{p,j}$, resulting in multiple sparse binary vectors $S_p$, which may be concatenated together to form a longer sparse binary vector S. Encoding a polynomial expansion of a feature space in this way produces equivalent results to computing the expanded polynomial feature space first and then subsequently encoding the expanded feature space, but can be performed much more efficiently as the encoding occurs over a smaller feature space.

By encoding the feature vectors F into sparse binary vectors S, and by selecting K=n, the vector transformation module 112 performs the MinHash algorithm, which requires the index of the first 1 value in random permutations of binary vectors to be encoded. For instances of a polynomial expansion of a feature space, the MinHash may be computed over a combinatorial space of binary hypercubes in logarithmic time. Thus, for a polynomial space of degree p, the MinHash may be computed in O(p) time, compared to $O(n^p)$ time for first expanding the polynomial feature space and then computing the MinHash.

The sparse binary vectors S described herein are based on the relative rank ordering of the feature vectors F, allowing the sparse binary vectors S to be resilient to noise that does not affect the implicit ordering of the elements of F. As discussed above, when determining the Euclidean distance in a high-dimensional vector, noise compounds proportional to the dimensionality of the vector, resulting in small changes to distance determinations as a result of changes in a small number of vector entries being dwarfed in magnitude by the compounded noise. By utilizing relative rank ordering, the sparse binary vectors S herein are largely immune to such compounding of noise as the exact values of each dimension become secondary in importance to the ranking of the elements, restricting the effect of noise associated with a single dimension to the values of the dimension and the nearest neighbor ranked dimensions. Noise only becomes relevant to the vector operations described herein when it is great enough to affect the ordering of the feature vectors F. Thus, the degree of invariance to noise is equivalent to the variance of the values of the feature vectors F.

The sparse binary vectors S herein are also resistant to variations that do not affect the implicit ordering of the elements of the feature vectors F by the feature module 110, the vector transformation module 112, or any other component. For example, the vectors F can be multiplied by scalar values without altering the ordering of the elements of the vectors F, and thus without affecting the produced sparse binary vectors S. Likewise, a constant value can be added to all elements of the vectors F without affecting the ordering of the elements of the vectors F and thus the vectors S. Similarly, values within the vectors F can be adjusted or otherwise changed individually so long as the ordering of the elements of F aren't affected. For example, for a vector $F_i$=[2, 9, 4, 13], the value "4" can fluctuate between the interval [3, 8] without affecting the ordered ranking of the elements of $F_i$ and the values of the associated vectors $S_i$.

The selection of K by the window module 202 determines the amount of information encoded by the encoder 206. The one-hot encoding discussed above encodes the index of the maximum value of a truncated permuted vector $P_{i,j,k}$ as 1 in an encoded vector $E_{i,j,k}$, and encodes the remaining indexes of $P_{i,j,k}$ as 0 in $E_{i,j,k}$. The encoded vector $E_{i,j,k}$ includes information about K−1 inequalities in $P_{i,j,k}$. For example, if $E_{i,j,k}$=[0, 1, 0, 0], it can be determined that $P_{i,j,k}(0) < P_{i,j,k}(1)$, that $P_{i,j,k}(2) \leq P_{i,j,k}(1)$, and that $P_{i,j,k}(3) \leq P_{i,j,k}(1)$. This is summarized by the inequality $P_{i,j,k}(x) \leq P_{i,j,k}(y) | E_{i,j,k}(y) = 1$ for all $0 \leq x \leq K-1$: $x \neq y$. Thus, the number of inequalities encoded by the encoder 206 is dependent on the selection of K by the window module 202.

For an embodiment with K=2, the encoder 206 encodes pairwise inequalities as bits. Computing the Hamming similarity or the dot-product between two feature vectors $F_i$ transformed into sparse binary vectors by the vector transformation module 112 in this embodiment produces a result which represents the number of pairwise-order agreements between the two sparse binary vectors.

For an embodiment with K=n, where n is the dimensionality of the feature vector $F_i$, the maximum value entry of each truncated permuted vector $P_{i,j,k}$ is the global max of the feature vector $F_i$. As each permutation encodes K−1 inequalities relating to the maximum value entry within the first K elements of the permutation, selecting K=n puts complete emphasis on the beginning of the permutations during encoding. Likewise, as discussed above, selecting K=2 does not put any bias on the beginning of the permutations as all pairs are encoded. Thus, as K approaches n, encoding the truncated permutations results in a progressively steeper bias towards the beginning of the permutations.

Returning to FIG. 1, it should be noted that the vector transformation module 112 may produce a sparse binary feature vector S for a media object in real-time when requested, or may produce sparse binary feature vectors S in advance. For example, the vector transformation module 112 may produce one or more sparse binary feature vectors S for each media object stored in the media storage module 116. Sparse binary feature vectors S produced in advance may be stored in the vector storage module 118 in conjunction with the stored media objects. Similarly, the other parameters used to produce the vectors S may be stored in the vector storage module 118, such as the permutations $\theta_j$, the magnitudes K, the features used by the feature module 110 to produce the feature vectors F for the media objects, the type of encodings used by the encoder 206, or any other parameter related to the creation of the sparse binary feature vectors S. By determining sparse binary feature vectors S for media objects stored in the media storage module 116 in advance, the media hosting service 100 (via, for example, the comparison module 114) can perform a variety of functions related to media features on stored media without having to produce sparse binary feature vectors S for stored media in real-time.

The comparison module 114 compares sparse binary feature vectors S representing two or more media objects to perform a variety of comparison functions between the two or more media objects. One example comparison function includes a similarity search between a target media object $T_i$ and a plurality of searchable media objects $M_z$. The vector transformation module 112 retrieves a feature vector $F_i$ for the target media object and produces a sparse binary feature vector $S_i$ for the object $T_i$. The comparison module 114 then scans a plurality of sparse binary feature vectors $S_z$ representing the plurality of media objects $M_z$ and identifies a sparse binary feature vector $S_z$ most similar to the vector $S_i$. In order for a determination of similarity to be made between sparse binary feature vectors, the same parameters must be used to create both the sparse binary feature vector $S_i$ and the sparse binary feature vectors $S_z$.

To identify a sparse binary feature vector $S_z$ most similar to the sparse binary feature vectors $S_i$, the comparison module 114 performs a vector dot product between the $S_i$ and each $S_z$. The comparison module 114 is configured to identify the sparse binary feature vector $S_z$ that results in the greatest dot product with $S_i$, and selects the media object $M_z$ associated with the identified vector $S_z$ as the media object most similar to the target media object $T_i$. It should be noted that for the purposes of the similarity search described herein, the selected media object $M_z$ determined to be most similar to the target media object $T_i$ based on the similarity of the sparse binary vectors associated with each is only determined to be the most similar to the target media object $T_i$ with regards to the feature or features used to produce the sparse binary vectors.

Similarity searches may be performed by combining the sparse media vectors $S_z$ associated with the media objects $M_z$ into a table, beneficially allowing the comparison module 114 to efficiently query the table and perform dot products on the entire set of sparse media vectors $S_z$ simultaneously. Searches for a media object $M_z$ similar to a target media object $T_i$ may be made more accurate or may be otherwise enhanced by concatenating multiple sets of sparse binary vectors $S_z$ for media objects $M_z$. These concatenated media object vectors can be queried by concatenating together a sparse binary vector $S_i$ for the tartget media object $T_i$ associated with each of the multiple sets of vectors $S_z$ and performing a dot product between the concatenated sparse binary vectors representing the media objects $M_z$ and the target media object $T_i$. Each of the multiple sets of sparse binary vectors represents a different feature, and thus performing a similarity search on concatenated sparse binary vectors representing multiple features will enhance the accuracy of the similarity search as the comparison module 114 will identify the media object $M_z$ most similar to $T_i$ with regards to multiple features and not just a single feature.

Similarity searches as described herein may be performed by the comparison module 114 in a variety of contexts. A similarity search may be performed on a library of images to identify an image to be used as a reference image for video encoding. For example, a similarity search may be performed in conjunction with the image retrieval system described in U.S. patent application Ser. No. 13/083,423, filed Apr. 8, 2011, the contents of which are hereby incorporated by reference. A similarity search may also be performed on media and other data in the context of identifying duplicate media and data in a data set, allowing the duplicate data to be discarded, reducing the footprint of the data set.

The comparison module 114 may also perform other comparison functions. For example, the comparison module 114 indexes media objects $M_z$ stored in the media storage module 116 using sparse binary vectors $S_z$ produced by the vector transformation module 112. The indexes may be stored in conjunction with the media objects $M_z$ in the media storage module 116. Given a high enough dimensionality, the stored indexes may be used to uniquely identify the media objects $M_z$. The stored indexes may be used by the comparison module 114 in performing nearest neighbor searches among the media objects $M_z$ for a target media object $T_i$. Similarly, the sparse binary vectors $S_z$ may be stored and used to fingerprint the media objects $M_z$.

The comparison module 114 may use sparse binary vectors $S_z$ produced by the vector transformation module 112 to tag or categorize the media objects $M_z$. The comparison module 114 may associate sparse binary vectors $S_z$ with particular media subject matters or categories. Accordingly, the comparison module 114 may categorize or tag media objects $M_z$ based on the sparse binary vectors $S_z$ of the media objects $M_z$ and the categories and subject matters associated with the sparse binary vectors $S_z$. The categorization and tagging of media objects using sparse binary vectors $S_z$ beneficially allows a massive library of media objects to be efficiently categorized and tagged, and allows media objects related to a target media object by category and tag to be displayed to a user of the media hosting service 100 currently interacting with the target media object.

Figure 4:
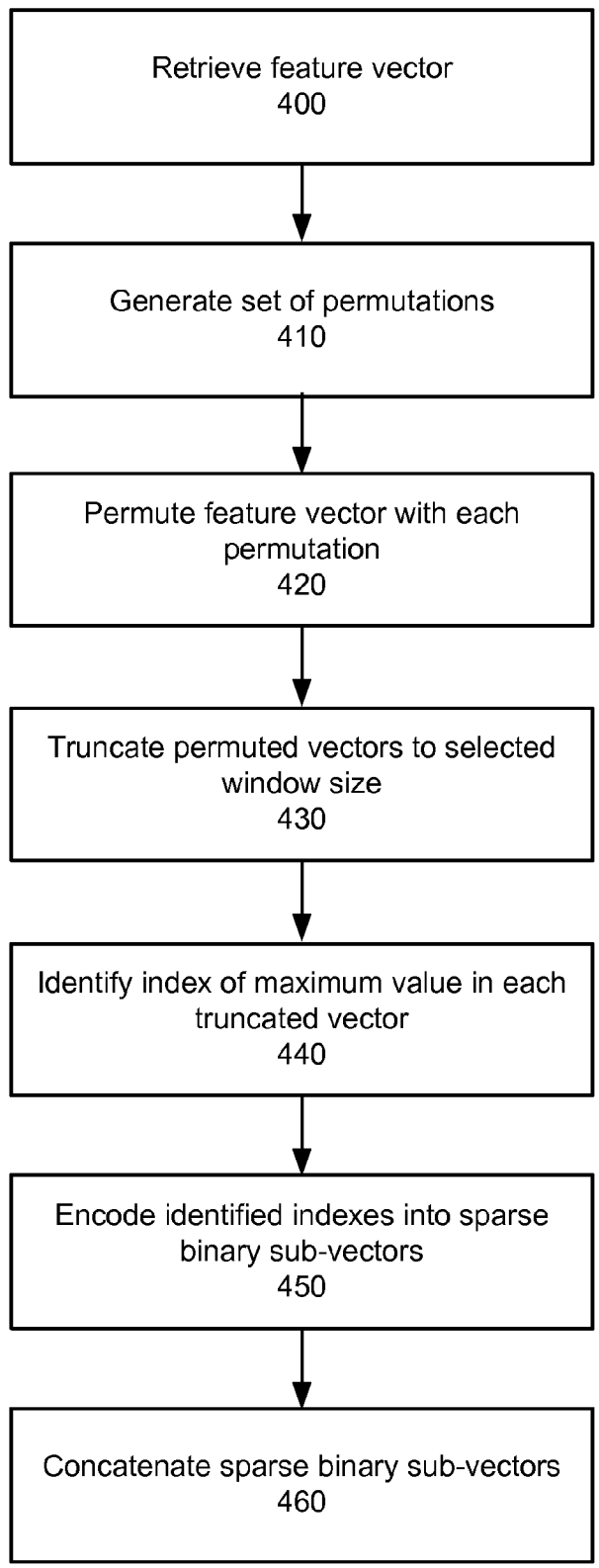
FIG. 4 is a flowchart of a process for encoding a feature vector into a sparse vector, according to one embodiment.

FIG. 4 is a flowchart of a process for encoding a feature vector into a sparse vector, according to one embodiment. A feature vector is retrieved 400. The retrieved feature vector includes feature information representing a media object (such as an image, video, or audio clip) or other data object (such as a collection of data, a data entry, a spreadsheet, or a document). The feature information may include information representing the motion rigidity of a video sequence, a color histogram computed using hue and saturation in HSV color space, audio spectrogram features, data variance, and any other properties of media or other data.

A set of permutations is generated 410, for instance randomly or formulaically. Each permutation includes a vector of the same dimensionality as the retrieved vector, and each permutation vector entry includes an ordinal representing a vector index. The set of permutations may include one permutation or many, for instance hundreds. The feature vector is permuted 420 with each permutation, producing a set of permuted vectors. The set of permuted vectors are truncated 430 to a magnitude determined by a selected window size. The selected window size may be randomly determined, or may be selected to bias the encodings towards the beginning of the permuted vectors. Truncating the permuted vectors involves retaining (in order) a number of the first permuted vector entries equal to the selected window size and discarding the remaining permuted vector entries.

The index of the maximum value of each truncated permuted vectors is identified 440. The maximum value of each truncated permuted vectors may be identified by performing vector entry comparisons between truncated permuted vector entry pairs to identify the greater of the two entries, comparing the greater of the two entries to the next truncated permuted vector entry, and repeating the process for the remainder of the entries. The identified index of the maximum value of each truncated permuted vectors is encoded 450 into a sparse binary sub-vector, for instance using a one-hot binary encoding scheme or any other suitable encoding scheme. The sparse binary sub-vectors are concatenated 460 into a sparse binary vector representing the retrieved feature vector. The sparse binary vector may be stored in conjunction with the feature vector for subsequent retrieval and processing.

Figure 5:
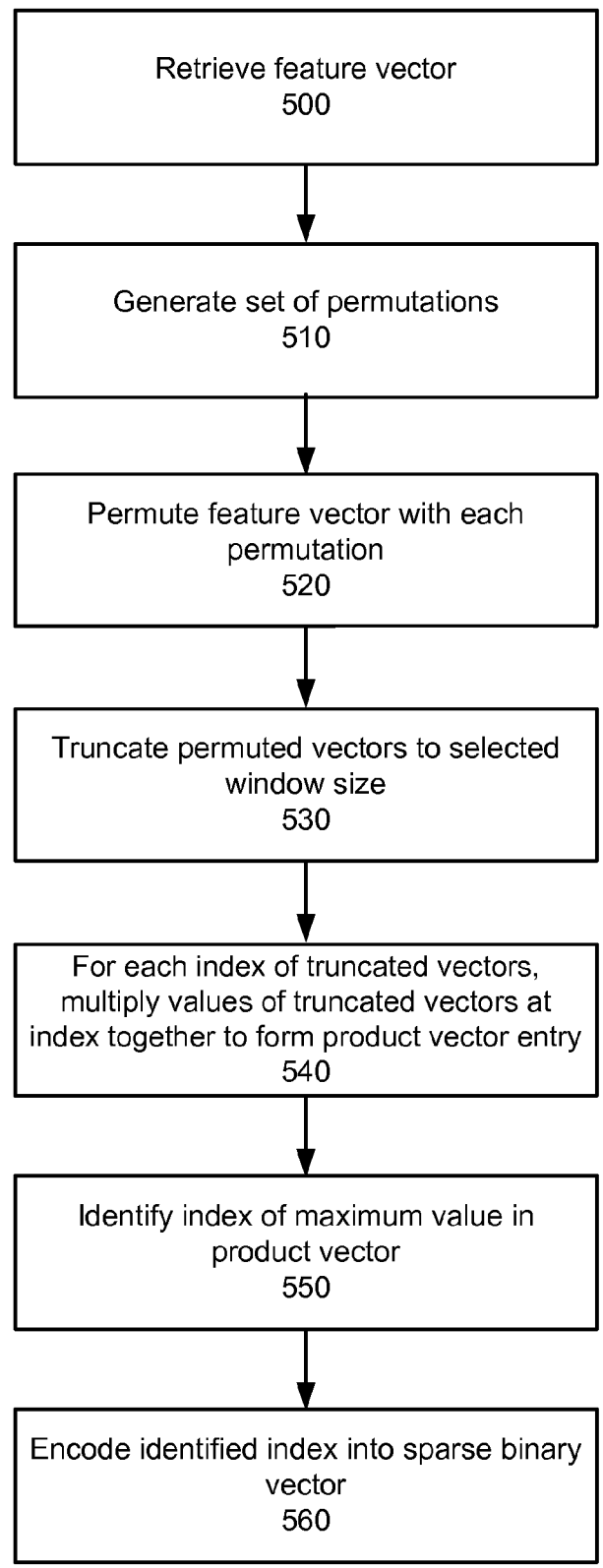
FIG. 5 is a flowchart of a process for encoding a polynomial space of a feature vector into a sparse vector, according to one embodiment.

FIG. 5 is a flowchart of a process for encoding a polynomial space of degree p of a feature vector into a sparse vector, according to one embodiment. A feature vector is retrieved 500, and a set p of permutations is generated 510. The feature vector is permuted 520 with each generated permutation, producing p permuted vectors. The p permuted vectors are truncated 530 to a selected window size.

For each index of the truncated vectors, the values of each truncated vector at the index are multiplied 540 together to form a product vector entry. The product vector entries collectively form a product vector, with each product vector entry located at the product vector index associated with the multiplied values of the truncated vectors. The index of the maximum value in the product vector is identified 550 and encoded 560 into a sparse binary vector. Similarly to the process of FIG. 4, this process may be applied to many sets of p permutations, producing sparse binary sub-vectors which may be concatenated into a sparse binary vector.

Figure 6:
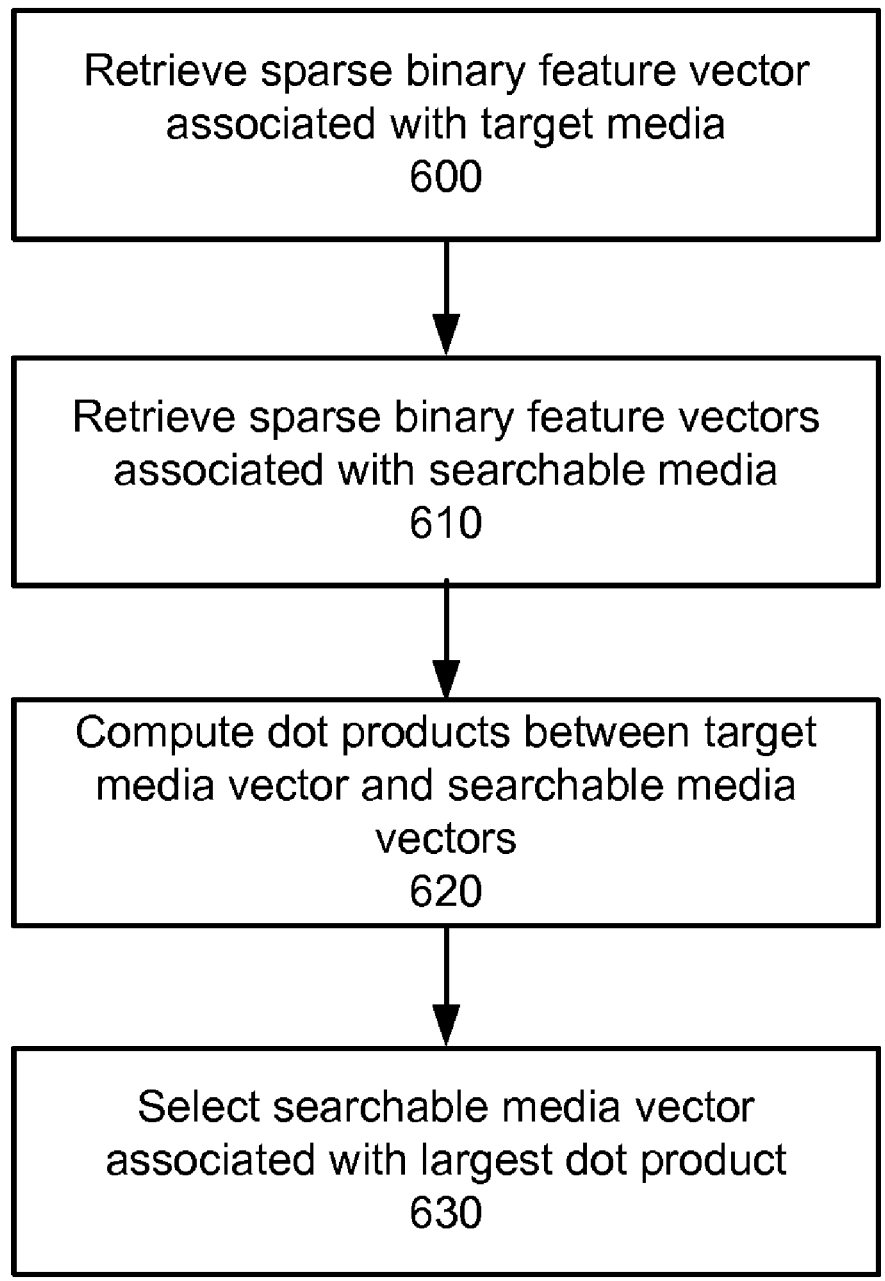
FIG. 6 is a flowchart of a process for performing a similarity search between a sparse binary feature vector for target media and sparse binary feature vectors for searchable media, according to one embodiment.

FIG. 6 is a flowchart of a process for performing a similarity search between a sparse binary feature vector for target media and sparse binary feature vectors for searchable media, according to one embodiment. A sparse binary feature vector associated with target media is retrieved 600. Sparse binary feature vectors associated with searchable media are similarly retrieved 610. The sparse binary feature vectors may be previously computed using the process of FIG. 4 and stored for subsequent retrieval. Alternatively, the sparse binary feature vectors may be computed in response to receiving a request for a similarity search from a user of a media system or a client.

A dot product is computed 620 between the sparse binary vector associated with the target media and each sparse binary vector associated with the searchable media. The sparse binary vector associated with the searchable media that results in the largest dot product is selected 630 as the sparse binary vector most similar to the sparse binary vector associated with the target media. The searchable media associated with the selected sparse binary vector may be selected as the searchable media most similar to the target media with regards to the feature or features associated with the sparse binary vectors.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of encoding a feature vector, the method comprising:
retrieving a feature vector, the feature vector representing a target media object;
generating a permutation, the permutation comprising a vector of ordinals, wherein the dimensionality of the permutation vector is equivalent to the dimensionality of the feature vector;
permuting the feature vector with the generated permutation;
truncating the permuted feature vector according to a selected window size;
identifying the index of the maximum value of the truncated permuted feature vector; and
producing a sparse binary vector, the sparse binary vector comprising the identified index encoded using one-hot encoding.

2. The method of claim 1, wherein the target media object represented by the feature vector comprises one of: an image, a video clip, and an audio clip.

3. The method of claim 1, wherein the permutation is generated randomly.

4. The method of claim 1, wherein permuting the feature vector with the generated permutation comprises re-ordering the entries of the feature vector according to the ordinals of the permutation.

5. The method of claim 1, wherein the window size is greater than or equal to 2, and less than or equal to the dimensionality of the feature vector.

6. The method of claim 5, wherein the greater the selected window size, the greater the bias towards the entries at the beginning of the permuted feature vectors, and wherein the window size is selected based on this bias.

7. The method of claim 1, wherein the window size is randomly selected.

8. The method of claim 1, wherein the sparse binary vector is configured to be compared to a set of searchable sparse binary vectors associated with searchable media objects to determine which searchable media object is the most similar to the target media object.

9. The method of claim 8, wherein comparing the sparse binary vector to the set of searchable sparse binary vectors comprises:
    computing a dot product between the sparse binary vector and each of the set of searchable sparse binary vectors;
    selecting the searchable sparse binary vector associated with the largest dot product; and
    identifying the searchable media object associated with the selected searchable sparse binary vector.

10. A non-transitory computer-readable storage medium having executable computer program instructions embodied therein for boosting a video classification score, the actions of the computer program instructions comprising:
    retrieving a feature vector, the feature vector representing a target media object;
    generating a permutation, the permutation comprising a vector of ordinals, wherein the dimensionality of the permutation vector is equivalent to the dimensionality of the feature vector;
    permuting the feature vector with the generated permutation;
    truncating the permuted feature vector according to a selected window size;
    identifying the index of the maximum value of the truncated permuted feature vector; and
    producing a sparse binary vector, the sparse binary vector comprising the identified index encoded using one-hot encoding.

11. The non-transitory computer-readable storage medium of claim 10, wherein the target media object represented by the feature vector comprises one of: an image, a video clip, and an audio clip.

12. The non-transitory computer-readable storage medium of claim 10, wherein the permutation is generated randomly.

13. The non-transitory computer-readable storage medium of claim 10, wherein permuting the feature vector with the generated permutation comprises re-ordering the entries of the feature vector according to the ordinals of the permutation.

14. The non-transitory computer-readable storage medium of claim 10, wherein the window size is greater than or equal to 2, and less than or equal to the dimensionality of the feature vector.

15. The non-transitory computer-readable storage medium of claim 14, wherein the greater the selected window size, the greater the bias towards the entries at the beginning of the permuted feature vectors, and wherein the window size is selected based on this bias.

16. The non-transitory computer-readable storage medium of claim 10, wherein the window size is randomly selected.

17. The non-transitory computer-readable storage medium of claim 10, wherein the sparse binary vector is configured to be compared to a set of searchable sparse binary vectors associated with searchable media objects to determine which searchable media object is the most similar to the target media object.

18. The non-transitory computer-readable storage medium of claim 17, wherein comparing the sparse binary vector to the set of searchable sparse binary vectors comprises:
    computing a dot product between the sparse binary vector and each of the set of searchable sparse binary vectors;
    selecting the searchable sparse binary vector associated with the largest dot product; and
    identifying the searchable media object associated with the selected searchable sparse binary vector.

19. A computer system for encoding a feature vector, the system comprising:
    a computer processor; and
    a non-transitory computer-readable storage medium storing executable computer program instructions comprising:
        retrieving a feature vector, the feature vector representing a target media object;
        generating a permutation, the permutation comprising a vector of ordinals, wherein the dimensionality of the permutation vector is equivalent to the dimensionality of the feature vector;
        permuting the feature vector with the generated permutation;
        truncating the permuted feature vector according to a selected window size;
        identifying the index of the maximum value of the truncated permuted feature vector; and
        producing a sparse binary vector, the sparse binary vector comprising the identified index encoded using one-hot encoding.

20. A computer implemented method of encoding a feature vector, the method comprising:
    retrieving a feature vector, the feature vector representing a target object;
    generating a set of permutations, the permutations comprising vectors of ordinals, wherein the dimensionalities of the permutation vectors are equivalent to the dimensionality of the feature vector;
    permuting the feature vector with the set of permutations, creating a set of permuted feature vectors;
    truncating the set of permuted feature vectors according to a selected window size, creating a set of truncated permuted feature vectors;
    identifying the index of the maximum value of each truncated permuted feature vector in the set of truncated permuted feature vectors;
    producing a set of sparse binary sub-vectors, each sparse binary sub-vector comprising an encoded identified index of a truncated permuted feature vector; and
    concatenating the sparse binary sub-vectors to produce a sparse binary vector.

21. The method of claim 20, further comprising:
    producing a sparse binary vector for each of a plurality of stored searchable objects; and
    storing the produced sparse binary vectors in conjunction with the stored searchable objects.

22. The method of claim 21, wherein each stored sparse binary vectors uniquely identifies the stored searchable object associated with the stored sparse binary vector.

23. The method of claim 21, wherein the stored sparse binary vectors are configured for use in performing nearest neighbor searches to identify a stored sparse binary nearest to a target sparse binary vector.

24. The method of claim 21, wherein the stored sparse binary vectors comprise digital fingerprints for the stored searchable objects.

25. The method of claim 21, wherein the stored sparse binary vectors are configured for use in categorizing the stored searchable objects.

26. The method of claim 20, wherein the feature vector comprises a polynomial space of a feature vector, the polynomial space of the feature vector comprising a polynomial degree.

27. The method of claim 26, further comprising:

generating a second set of permutations, the second set of permutations comprising a number of permutations equivalent to the polynomial degree;

permuting each permuted feature vector with the second set of permutations, creating a subset of permuted feature vectors for each permuted feature vector;

truncating each vector in each subset of permuted feature vectors according to the selected window size, creating a subset of truncated permuted feature vectors for each permuted feature vector; and for each subset of truncated permuted feature vectors:

for each index of the truncated permuted feature vectors, multiplying the values at the index of each truncated permuted feature vector together to form a product vector entry, the product vector comprising the same dimensionality as the truncated permuted feature vectors, the product vector entry located at the index;

identifying the index of the maximum value of the product vector; and encoding the identified index as the sparse binary subvector.

28. The method of claim 27, wherein the encoding is one-hot encoding.

29. The method of claim 20, further comprising:

producing a set of sub-encodings, each sub-encoding comprising an identified index of a truncated permuted feature vector encoded using maximum entropy encoding; and concatenating the set of sub-encodings to produce an encoding.

30. The method of claim 20, wherein the encoded identified index is encoded using one-hot encoding.

* * * * *